US012694412B2

(12) United States Patent (10) Patent No.: US 12,694,412 B2
Jungclaus (45) Date of Patent: Jul. 28, 2026

(54) APPARATUS FOR THE AUTOMATED RETURN OF A GOOD AND METHOD FOR OPERATING THE APPARATUS

(71) Applicant: Wincor Nixdorf International GmbH, Paderborn (DE)

(72) Inventor: Kai Jungclaus, Langenfeld (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 673 days.

(21) Appl. No.: 17/632,830

(22) PCT Filed: Aug. 6, 2020

(86) PCT No.: PCT/EP2020/072129
§ 371 (c)(1),
(2) Date: Feb. 4, 2022

(87) PCT Pub. No.: WO2021/023814
PCT Pub. Date: Feb. 11, 2021

(65) Prior Publication Data
US 2022/0270111 A1 Aug. 25, 2022

(30) Foreign Application Priority Data
Aug. 8, 2019 (DE) ..................... 10 2019 121 454.8

(51) Int. Cl.
*G06Q 30/016* (2023.01)
*G06Q 10/087* (2023.01)
*G07C 9/00* (2020.01)
(52) U.S. Cl.
CPC ......... *G06Q 30/016* (2013.01); *G06Q 10/087* (2013.01); *G07C 9/00912* (2013.01)
(58) Field of Classification Search
CPC ........... G06K 2017/0051; G06Q 10/08; G06Q 20/203; G06Q 30/0223; G06Q 30/06;
(Continued)

(56) References Cited

U.S. PATENT DOCUMENTS

2004/0249648 A1 12/2004 Rosler et al.
2007/0066351 A1* 3/2007 Silverbrook ......... G06Q 20/322
455/557
(Continued)

FOREIGN PATENT DOCUMENTS

EP 3142085 A1 3/2017
GB 2491340 A * 12/2012 ............. G07F 17/12
WO 2019084048 A1 5/2019

OTHER PUBLICATIONS

International Search Report filed in the corresponding PCT Application dated Oct. 6, 2020 written in the German lanuage; 4 pages.
(Continued)

*Primary Examiner* — Avia Salman
(74) *Attorney, Agent, or Firm* — Black Mccuskey

(57) ABSTRACT

An apparatus for the return of a good has a reading unit for capturing details concerning the good; an input unit for inputting information representative of the good; a display unit for displaying the details and/or the information; at least one locker that is unlockable and lockable; a checking unit that checks whether the good is in the locker; and a control unit that is electrically coupled to the reading unit, the input unit, the display unit, the locker, and the checking unit. The control unit uses the proof and the input information to check whether the good can be returned, uses the display unit to display information about the good and information concerning the return of the good, unlocks the locker to receive the good and locks the locker after the good has been received, uses the checking unit to check whether the good is in the locker.

13 Claims, 2 Drawing Sheets

(58) Field of Classification Search
CPC ...... G06Q 30/00; G06Q 30/02; G06Q 10/087;
G06Q 30/0633; G06Q 50/188; G06Q
20/3278; G06Q 20/3274; G07F 13/04;
G07G 1/0054; G07G 1/0072; G07G
1/0036; G07G 1/0045; G07G 1/009;
G08B 13/1472; H05B 6/6464; Y10S
360/904; Y10T 16/602; Y10T 16/685;
Y10T 74/1243; H04L 67/54; H04L
63/0861; H04W 12/06; H04W 12/50;
H04W 12/63; H04W 4/02; H04W 4/023;
H04W 4/027; H04W 4/029; H04W 4/50;
H04W 64/006; H04W 76/14; H04W
8/005; H04W 8/02; H04W 8/22; H04W
4/008; H04W 4/80; G03G 21/1657; G06F
19/323; G06F 2212/178; G09F 3/0335;
G16H 10/65; H01H 2300/032; H04M
2250/04; H04Q 1/138; H04Q 2209/47
USPC ......................................................... 705/28

See application file for complete search history.

(56) References Cited

U.S. PATENT DOCUMENTS

| | | | |
|---|---|---|---|
| 2008/0111691 A1* | 5/2008 | Lee ........................ | G06K 17/00 |
| | | | 340/572.1 |
| 2011/0119142 A1* | 5/2011 | Maraz .................. | G06Q 20/202 |
| | | | 705/302 |
| 2012/0226620 A1* | 9/2012 | Junger ................... | G06Q 30/00 |
| | | | 705/304 |
| 2015/0186840 A1 | 7/2015 | Torres | |
| 2015/0193733 A1* | 7/2015 | Bouzit-Benbernou ..................... | |
| | | | G07F 17/13 |
| | | | 705/332 |
| 2015/0371187 A1* | 12/2015 | Irwin ................. | G06Q 10/0836 |
| | | | 705/72 |
| 2017/0039572 A1* | 2/2017 | Hammond ........... | G06Q 20/202 |
| 2020/0151735 A1* | 5/2020 | Patil ................... | G06Q 30/0185 |
| 2021/0304132 A1* | 9/2021 | Kusaba ................ | G06K 7/1413 |

OTHER PUBLICATIONS

Written Opinion filed in the corresponding PCT Application dated written in the German language; 6 pages.

* cited by examiner

APPARATUS FOR THE AUTOMATED RETURN OF A GOOD AND METHOD FOR OPERATING THE APPARATUS

The invention relates to an apparatus for the automated return of a good and to a method for operating the apparatus.

In shops that use various modern trade formats such as supermarkets or discount shops, there are often no dedicated information stands where goods purchased in the relevant store can be returned, for example, to exchange the goods, to be reimbursed the money for the goods, or to receive a credit for the value of the returned goods. In these stores, the exchange is usually carried out at one of the regular check-outs by the appropriate cashier.

This can cause the following problems: the appropriate cashier is diverted from their main task, namely checking out purchases, and a queue can form at the relevant check-out. Furthermore, it is possible that due to the usual time pressure, in order to avoid a queue forming, only inadequate monitoring of the right to exchange and/or the condition of the goods is performed. In addition, customers must often take the goods to be returned with them into the store, a process which involves the potential for fraud, for example to the extent that although proof of purchase of the good is presented, for example a till receipt, the good is not the same as that to which the proof relates but the good is only one of the same type that has been newly taken from the store. In addition, exchanged goods can accumulate at the checkout, where there is usually no room for these additional goods.

An object of the invention is to provide an apparatus for the automated return of a good which helps to ensure that few or no personnel is required for the return of the good, that no goods are returned improperly, that fraud is prevented when goods are returned or when supposedly exchanged goods are taken away, and/or that the return can be easily monitored, recorded, and/or logged.

An object of the invention is to provide a method for operating an apparatus for the automated return of a good which helps to ensure that few or no personnel is required for the return of the good, that no goods are returned improperly, that fraud is prevented when goods are returned or when supposedly exchanged goods are taken away, and/or that the return can be easily monitored, recorded, and/or logged.

One object of the invention is achieved by an apparatus for the automated return of a good, having: a reading unit for capturing proof containing details concerning the good; an input unit for inputting information representative of the good and the reason for the exchange; a display unit for displaying the details and/or the information; at least one locker that is automatically unlockable and automatically lockable for receiving the good; a checking unit that is arranged and designed such that the checking unit can be used to check whether or not the good is in the locker; and a control unit that is electrically coupled to the reading unit, the input unit, the display unit, the locker and the checking unit. The control unit is configured to: use the proof and the input information to check whether the good can be returned; to use the display unit to display the information about the good and information concerning the return of the good; to unlock the locker to receive the good and to lock the locker after the good has been received; to use the checking unit to check whether the good is actually in the locker; and to approve the return if the good can be returned and the good is in the locker, and to prevent the return if the good cannot be returned or the good is not in the locker.

The apparatus allows a fully automatic return of a previously purchased good. This contributes to ensuring that few or no personnel is required to return the good. In addition, it contributes to ensuring that no goods are returned improperly and/or that fraud is prevented when returning the goods or when taking away supposedly exchanged goods. In general, the apparatus allows the return to be easily monitored, recorded and/or logged.

According to a further development, the details are representative of when and where the good was purchased. The date of purchase is in principle sufficient for the indication of when the good was purchased. For most goods, there is a statutory return period and/or one specified by the relevant store, within which the goods can be returned. By indicating when the goods were purchased, the apparatus can automatically determine whether the good is returned within the predefined return period. In some cases, with regard to indicating where the good was purchased, an indication of the company in whose store the goods were purchased may be sufficient, in particular if the company has multiple branches and the return can be made at any branch, regardless of the store where the good was purchased.

Otherwise, the indication of where the goods were purchased preferably contains the address of the store or, if appropriate, the branch, in particular if the good can only be returned in the same store or branch where the good was purchased.

According to a further development, the reading unit is a barcode scanner and the details are encoded in a barcode. The barcode can be a one-dimensional or a two-dimensional barcode. Alternatively, the information may be encoded in a code invisible to the naked eye, such as is provided by the Digimarc company.

According to a further development, the input unit comprises a keyboard and/or a touch screen and the information is representative of which good is to be returned and/or the information relates to the customer who wishes to exchange or return the good. For example, the customer who wishes to return the good can input the description of the good by means of the input unit. Alternatively, after scanning the proof, the apparatus can indicate to the customer which goods are identified on the proof, and the customer can use the input unit to select the goods they wish to return. The customer can also use the input unit to enter information about him/herself, for example a customer number and/or an address and/or a postal code of the customer's place of residence.

According to a further development, the display unit has a display and the display unit is configured to display the captured proof, the information, and/or various selection options. The proof can be displayed after it has been scanned. Alternatively or in addition, the customer can be shown the goods indicated on the proof. The information entered by the customer can also be displayed. For example, the display can be an LCD screen or an OLED screen.

According to a further development, the locker comprises an electrically controllable locking device that is electrically coupled with the control unit and is configured to allow or deny access to the locker. The locking device comprises, for example, a locking mechanism that can be operated by means of an electrically controllable actuator. If necessary, the actuator can be electrically connected to the control unit. The locker comprises, for example, a door designed to allow the good to be placed in the locker when the door is in the open state, to prevent the good from being removed when the door is in the closed state, and to be lockable by means of the closing device when in the closed state. Alternatively, the locker may have a drawer designed to allow the good to be inserted in it when the drawer is pulled out and to be lockable by means of the locking device in the closed state. Optionally, the locker may have a further access, such as an additional door or flap, which is formed, for example, on the rear of the apparatus and through which the good can be removed automatically or by an employee of the store without having to open the customer-accessible access to the locker. In addition to the one locker, the apparatus can have one, two or more other similar lockers.

According to a further development, the checking unit comprises: an internal camera arranged in such a way that an image can be taken of the interior of the locker by means of the internal camera; and/or a weighing scale arranged in such a way that a weight of the good in the locker can be measured by means of the weighing scale. The interior of the locker can be monitored using the internal camera. The image of the interior can be transmitted to a monitor for checking by a store employee, for example in the store or remotely from the store, and/or to an image processing unit. The employee or the image processing unit can then check by means of the image whether the good has been inserted, whether the description of the inserted good matches the description of the good input by the customer, and/or whether the good is in perfect condition. If the weight of the good is measured by means of the scale, it is possible to check automatically, using a database in which the weights of the goods in the store are stored, whether the weight of the good placed in the locker corresponds to the weight of the good, the description of which was input by means of the input unit.

According to a further development, the apparatus comprises an external camera for recording the customer who wishes to return the good and/or for recording the placement of the good in the locker and/or for recording the input of the information. The external camera can act as an additional protection against fraud attempts. The external camera can be installed such that it is visible to the customer or invisible to the customer.

According to a further development, the apparatus comprises a housing in which the reading unit, the input unit, the display unit, the locker, the checking unit, the control unit, the internal camera, the weighing scale, and/or the external camera are arranged. In this context, the apparatus 20 can also be referred to as a return machine, a goods return machine, an exchange machine, a goods exchange machine, a return kiosk, exchange kiosk, or simply as a kiosk.

An object of the invention is achieved by a method for operating an apparatus for the automated return of a good, for example, for operating the apparatus explained in the preceding text. In this case, the proof containing details regarding the good is captured by means of the reading unit. The display unit displays the proof and/or the details, and the customer who wishes to return the good is prompted to input information about the good and the reason for the exchange, and to place the good in the locker. The control unit is used to unlock the locker and check whether the good is in the locker. The control unit checks whether the good can be returned on the basis of the details and the information input. The return is approved if the good can be returned and the good is in the locker.

The advantages and further developments of the apparatus explained in the preceding text can be easily transferred to advantages and further developments of the method. Therefore, these advantages and further developments are not described again here, but the above text is referred to in order to avoid unnecessary repetition.

For example, the return may be approved if the good is returned within the return period, if the good is returned to the same store where it was bought, or if the good is returned at least to a branch of the same company, if the correct good is in the locker and/or if the good is complete and/or undamaged.

According to a further development, the details regarding the good are encoded in a barcode and the barcode is scanned to capture the proof.

According to a further development, the proof comprises details about multiple goods, the details are displayed on the display unit and the customer is prompted by means of the display unit to use the input unit to select the goods to be returned.

According to a further development, it is checked whether the goods are in the locker by taking an image of the interior of the locker using the internal camera and then using an image processing program to check whether the good is visible in the image, and/or by measuring a weight of the good in the interior using the weighing scale and checking whether the weight of the good in the interior corresponds to the weight of the good to which the detail relates. As an alternative to checking the image using the image processing program, the review can also be carried out by an employee of the relevant store.

According to a further development, the details show a date of purchase and a place of purchase of the good and it is checked whether the good can be returned by automatically checking, based on the date of purchase, whether the exchange and/or return is being made within a predefined period of time from the date of purchase, and/or by automatically checking, based on the place of purchase, whether the place of return is suitable for the return.

According to a further development, if the return is approved a receipt is automatically generated which is provided to the customer and is representative of the fact that the return is approved. The customer can then proceed to the checkout with the receipt and exchange the goods, obtain a credit, or have the purchase price refunded.

According to a further development, the control unit is used to check whether a predefined condition is met and an employee of the store in which the good is to be exchanged and/or returned is informed if the predefined condition is met. For example, based on the predefined condition, it can be checked whether the good can be returned automatically. For example, in the case of very high-priced goods and/or large quantities of goods, it may not be desirable for the goods to be returnable automatically, rather the return should only be able to be performed by an employee of the store. Accordingly, in the case of a product for which the price exceeds a predefined price threshold, or if the number of goods is above a predefined quantity threshold, the apparatus, in particular the control unit, can be designed to send a notification to a store employee to inform the customer about this fact via the display unit and to not approve the return of the goods.

Exemplary embodiments of the invention are shown in the drawings and will be explained in more detail in the following.

Figure 1:
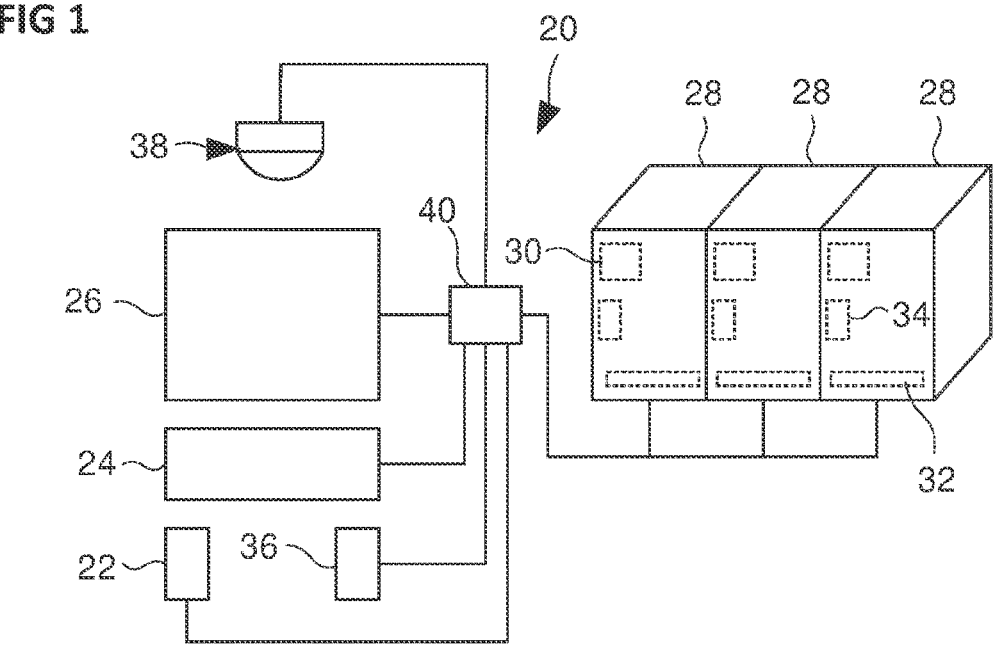
FIG. 1 shows a schematic representation of an exemplary embodiment of an apparatus for the automated return of a good.

In the detailed description that follows, reference will be made to the attached drawings, which form part of this description and in which specific embodiments in which the invention may be realized are shown for illustration purposes. Because components of exemplary embodiments can be positioned in a number of different orientations, the directional terminology is used for illustration purposes only, and is in no way restrictive. It goes without saying that other exemplary embodiments can be used and structural or logical changes can be made without departing from the scope of protection of the present invention. It goes without saying that the features of the various exemplary embodiments described herein can be combined with one another, unless specifically stated otherwise. The following detailed description is therefore not to be understood in a restrictive sense, and the scope of protection of the present invention is defined by the attached claims. In the figures, identical or similar elements are labeled with identical reference numerals, where this is appropriate.

FIG. 1 shows a schematic representation of an exemplary embodiment of an apparatus 20 for the automated return of a good. The apparatus 20 is used to allow a customer to return a good purchased in a store to the store automatically, without the aid of store personnel. For example, the apparatus 20 can be located in the entrance area of the store, for example in a supermarket in front of the entrance turnstile or the entrance gate, so that the customer does not need to take the goods to be exchanged with them to the area where the other goods are on sale. If the store has two entrance gates, the apparatus 20 can be arranged, for example, between the two entrance gates. The apparatus 20 can also be called a return kiosk or simply a kiosk.

The apparatus 20 comprises a reading unit 22, an input unit 24, a display unit 26, at least one locker 28, in the embodiment shown in FIG. 1 three safety lockers 28, and a control unit 40. As an option, the apparatus 20 can also have an output unit 36 and/or an external camera 38.

The reading unit 22 is electrically coupled to the control unit 40. The reading unit 22 is used to capture proof of the purchase of the good. The proof contains details about the purchase of the good. The proof can be a till receipt, for example. The details may include, for example, a unique identification number of the proof or of the corresponding purchase, the description of the goods, the quantity of the goods, the day of purchase, for example, the date of purchase, and/or the place of purchase, for example, the name of the company in whose store the goods were purchased or the address of the company's store or branch. For example, the proof may comprise a barcode in which the details or part of the details is encoded. The barcode can also be referred to as a transaction barcode. The barcode can be a one-dimensional or a two-dimensional barcode, for example. Alternatively, the details may be encoded in a code that is not visible to the naked eye. Accordingly, the reading unit 22 can comprise a scanner, in particular a barcode scanner.

The display unit 26 is electrically coupled to the control unit 40. The display unit 26 is used to display the proof, the details and/or other information, such as information regarding the return and/or the customer who wishes to return the good. For example, the display unit 26 comprises a display, such as an LCD display or an OLED display. The information regarding the return can include, for example, a message that the return is accepted or a message that the return is not accepted, in which case a reason for the refusal of the return may also be displayed.

The input unit 24 is electrically coupled to the control unit 40. For example, the input unit 24 has a keyboard or a touch screen. In the case of the touch screen as the input unit 24, the input unit 24 and the display unit 26 can be integrated into a common device that serves as both the input unit 24 and the display unit 26. The input unit 24 is used to input which good is to be returned, whether the good is only to be returned or exchanged, and/or why the good is to be returned. In addition, the customer can also use the input unit 24 to enter information about him/herself, for example a customer number, a customer address or at least part of a customer address, for example a postal code of the customer's place of residence. The customer can provide their input character by character using the keyboard or touch screen, or by selecting appropriate display elements or list elements on the display unit 26. For example, the display unit 26 can be used to display the goods to which the proof relates, and the customer can then select the goods they want to return from the displayed list.

The lockers 28 each have a checking unit and a locking device 34. The checking unit has an internal camera 30 and/or a weighing scale 32.

The internal camera 30 is electrically connected to the control unit 40. The internal camera 30 is used to monitor the interior of the locker 28 to detect whether a good has been placed in the locker 28, which good has been placed in the locker 28, and/or whether the good in the locker 28 is in perfect condition. The internal camera 30 can capture a video recording or still images of the interior. The video recording or the still images are then transmitted to the control unit 40. The control unit 40 can transmit the video or still images to a screen that is monitored by a store employee, wherein the screen and the corresponding employee may be in the store or outside the store. Alternatively, the control unit 40 can automatically check the goods using image processing software.

The weighing scale 32 is electrically connected to the control unit 40. The weighing scale 32 is used to monitor the interior of the locker 28, to detect whether a good is placed in the locker 28 and/or detect the weight of the good placed in the locker 28. The weighing scale 32 transmits the weight of the good to the control unit 40. The control unit 40 can check whether the actual weight of the good corresponds to the weight that the good specified by the user should have. For this purpose, a database can be stored on a memory unit of the control unit 40, in which the goods available in the store and their weights are listed. During the check, the control unit 40 then compares the measured weight with the weight of the corresponding good indicated in the database.

The locking device 34 has, for example, a locking mechanism for locking an access to the locker 28, and an electrically controllable actuator which is electrically connected to the control unit 40 for electrically operating the locking mechanism. The access to the locker 28 is preferably located at a place within the store that is easily accessible to the customer and in particular to the apparatus 20. The access to the locker 28 can be enabled or prevented by means of a door or a flap, for example. Alternatively, the access to the locker 28 can be a drawer which can be pulled out and into which the good can be inserted when the drawer is in the pulled-out state. Optionally, the locker 28 can have an additional access, such as one that is only accessible to a store employee and not to the customer. For example, the additional access may be formed on the rear of the apparatus 20. The goods can be removed from the apparatus 20 by the employee manually or automatically via the additional access. The additional lockers 28 can be designed in the same way as the locker 28. The locker 28 can also be referred to as a lockbox.

The output unit 36 is electrically connected to the control unit 40. The output unit 36 is used to print out a receipt for the return and to provide it to the customer. The customer can then exchange the goods with the receipt by taking a new good to the checkout with the receipt, or the customer can obtain a credit note with the receipt at the checkout, or have the purchase price paid back on the basis of the receipt at the checkout.

The external camera 38 is electrically connected to the control unit 40. The external camera 38 is used to monitor the return of the good and the corresponding customer externally, thereby helping to prevent fraud attempts. For example, the external camera 38 can be a dome camera.

In the exemplary embodiment shown in FIG. 1, the reading unit 22, the input unit 24, the display unit 26, the lockers 28, in particular the internal camera 30, the weighing scale 32 and the locking device 34, as well as the output unit 36 and the external camera 38 are electrically connected to the control unit 40. Each of these electrical connections can be a wired connection. Alternatively, one or more of these connections can be implemented by a wireless connection, for example, based on Bluetooth, WLAN or other suitable wireless communication standards. In addition, the control unit 40 can comprise a plurality of control modules that perform sub-tasks of the control unit 40 and/or that are separated from each other and/or accommodated in separate housings.

Figure 2:
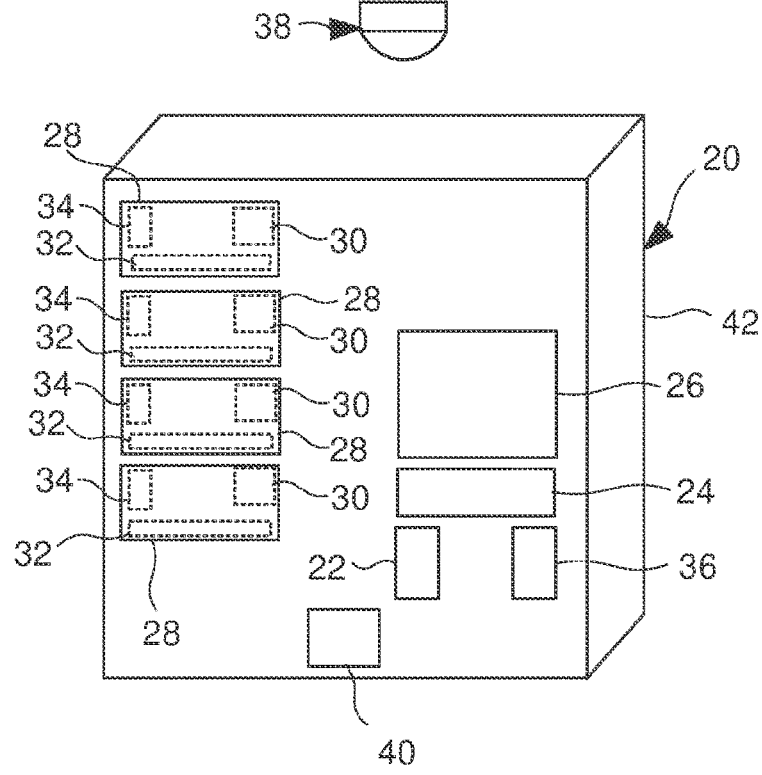
FIG. 2 shows an exemplary embodiment of an apparatus for the automated return of a good.

FIG. 2 shows an exemplary embodiment of an apparatus 20 for the automated return of a good. For example, the apparatus 20 can correspond to a large extent to the apparatus 20 explained with reference to FIG. 1. The apparatus 20 comprises a housing 42 in which the reading unit 22, the input unit 24, the display unit 26, the lockers 28, in particular the internal camera 30, the weighing scale 32 and the locking device 34, and, if applicable, the output unit 36 are arranged. In the exemplary embodiment shown in FIG. 2, the external camera 38 is arranged outside the housing 42, for example on a ceiling above the apparatus 20. Alternatively, however, the external camera 38 can also be arranged in the housing 42. The operating principles and designs of the individual components of the apparatus 20 correspond to the operating principles and designs of the corresponding components explained with reference to FIG. 1. Therefore, a repeated presentation of the components and their operating principles is omitted and the explanations with reference to FIG. 1 are simply referred to. In broad terms, the embodiments according to FIG. 1 and according to FIG. 2 differ in that in the case of the apparatus 20 according to FIG. 2 all components except the external camera 38 are arranged in one housing, in particular the housing 42.

In the case of other possible embodiments which are not explicitly shown here, one, two or more of the components of the apparatus 20 may be arranged outside the housing 42. For example, the lockers 28, the control unit 40 or, if applicable, individual control modules of the control unit 40, may be arranged outside the housing 42 and/or apart from the housing 42.

Figure 3:
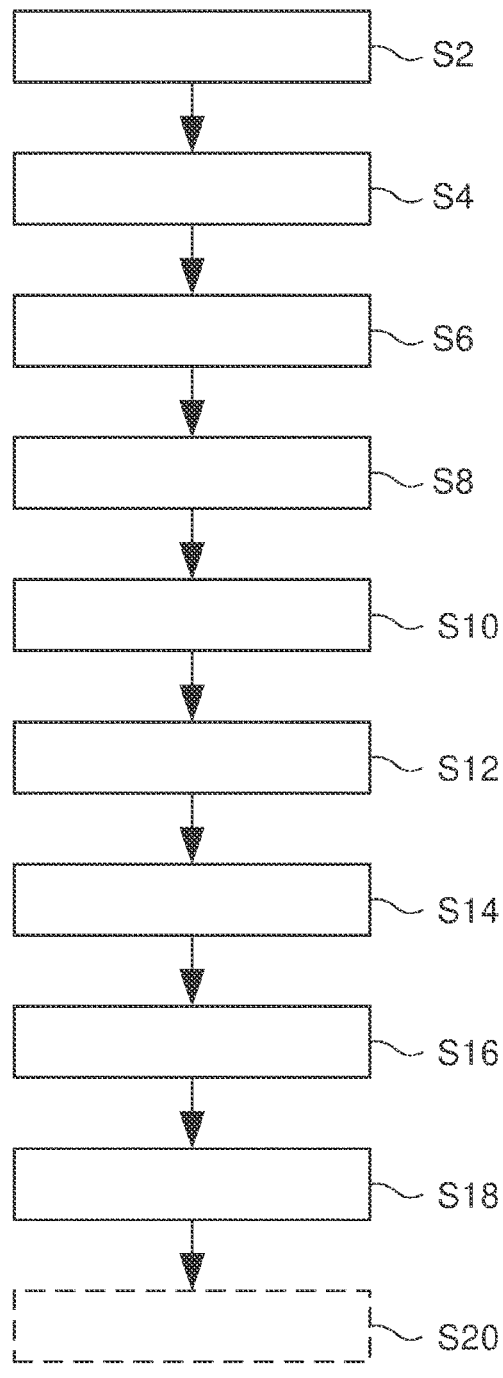
FIG. 3 shows a flow diagram of an exemplary embodiment of a method for operating an apparatus for the automated return of a good.

FIG. 3 shows a flow diagram of an exemplary embodiment of a method for operating an apparatus for the automated return of a good, for example for operating an apparatus 20 of the kind explained in the foregoing.

In step S2, the return of the good can be initiated, for example by means of an appropriate input by the customer in the input unit 24. For example, the return of the good can be initiated by simply pressing an appropriate button. Alternatively, the return of the good can be initiated by inputting the identification number of the proof or of the purchase, for example. In the course of initiating the return, for example, access to the locker 28 can be enabled, for example by controlling the locking device 34.

In step S4, the customer is prompted, for example by means of the display unit 26, to have the proof of the purchase of the good read in, for example by means of the reading unit 22. Alternatively, step S2 and step S4 can be processed at the same time. For example, the return of the good can be initiated automatically if the customer holds the proof up to the reading unit 22 and the reading unit 22 recognizes the proof as such.

In step S6, the customer is shown all the goods to which the proof relates. In particular, the details about the goods identified on the proof can be presented to the customer on the display unit 26.

In step S8, the customer is prompted, for example by means of the display unit 26, to select or enter the good that the customer wants to return, for example by means of the input unit 24. In addition, in step S8 the customer may be prompted to select the reason for the return from a list or to enter it manually. In addition, in step S8 the customer may be prompted to input information about themselves by means of the input unit 24, for example. This information can be, for example, the customer's address, such as the customer's postal code, a customer number, or something similar. The input of the information about the customer can optionally be performed automatically by presenting and scanning a customer card or the customer's ID card by means of the reading unit 22, for example. In addition, in step S8 the relevant customer inputs are captured by means of the control unit 40, for example.

In step S10, the control unit 40, for example, automatically checks whether the good selected or input by the customer can be returned, for example by entering the relevant place of purchase and/or the relevant date of purchase, optionally taking into account the reason for return. In particular, it is possible to check whether the good was purchased in the same store or in another branch of the same company and whether the return period has not yet expired. If the return is possible, processing is continued in step S12. If the return is not possible, the customer is informed about this, for example by means of the display unit 26, wherein a reason for the refusal of the return of the good can optionally be issued.

In step S12, the customer can be prompted, for example by means of the display unit 26, to place the good in the locker 28.

In step S14 a check is made as to whether the good is in the locker 28. This check can be carried out, for example, by means of the internal camera 30 and/or by means of the weighing scale 32. If the good is in the locker 28, the locker 28 is automatically locked, in particular by controlling the locking device 34, and processing is continued in step S16. If the good is not in the locker 28, a predefined waiting period can be allowed to elapse and after the predefined period has elapsed the customer can be prompted again to place the good in the locker 28, if this has not been carried out in the meantime. If the customer still does not place the good in the locker 28, the method and thus the return operation can be aborted.

In step S16, the image of the good and/or the weight of the good is/are used to check whether the good is in perfect condition. The inspection of the good can be performed automatically by means of an image processing program, for example by the control unit 40. Alternatively, the good can be inspected by an employee in the store or remote from the store, in which case the image or the weight of the good is transmitted to the relevant employee electronically. If the good is in perfect condition, the return is approved and processing is continued in step S18. If the good is not in perfect condition, the return is not possible and the customer is informed of this, for example by means of the display unit 26, wherein a reason for the refusal of the return of the goods and/or an instruction to contact an employee can optionally be issued, for example, by means of the display unit 26.

In step S18 the customer is shown, for example by means of the display unit 26, that the return is accepted. Optionally, a receipt for the approval of the return can be printed out for the customer, for example, by means of the output unit 36. For example, the receipt may have a one-dimensional or two-dimensional barcode or a code invisible to the naked eye. Alternatively, the receipt can be sent to the customer in electronic form, for example via Bluetooth, WLAN or a suitable telephone connection. If the customer has a customer card for the store, the credit can be stored directly on the customer card.

In an optional step S20, the good can be automatically removed from the locker 28, for example via the additional access described in the foregoing and/or for example by means of a conveyor belt or a robot that is not accessible to the customer. Alternatively, the locker 28 can be emptied by an employee of the store.

According to a first example, an apparatus is provided for the automated return of a good, having a reading unit for capturing proof containing details concerning the good; an input unit for inputting information representative of the good and the reason for the exchange; a display unit for displaying the details and/or the information; at least one locker that is automatically unlockable and automatically lockable for receiving the good; a checking unit that is arranged and designed such that the checking unit can be used to check whether or not the good is in the locker; and a control unit that is electrically coupled to the reading unit, the input unit, the display unit, the locker and the checking unit and that is configured: to use the proof and the input information to check whether the good can be returned, to use the display unit to display the information about the good and information concerning the return of the good, to unlock the locker to receive the good and to lock the locker after the good has been received, to use the checking unit to check whether the good is actually in the locker and to approve the return if the good can be returned and the good is in the locker, and to prevent the return if the good cannot be returned or the good is not in the locker.

According to a second example, an apparatus according to the first example is provided, in which the details are representative of when and where the good was purchased.

According to a third example, an apparatus according to the second example is provided, in which the reading unit is a barcode scanner and in which the information is encoded in a barcode.

According to a fourth example, an apparatus according to one of the previous examples is provided, in which the input unit comprises a keyboard and/or a touch screen and the information is representative of which good is to be returned and/or the information relates to the customer who wishes to exchange or return the good.

According to a fifth example, an apparatus according to one of the previous examples is provided, in which the display unit comprises a display and in which the display unit is configured to display the captured proof, the information, and/or various selection options.

According to a sixth example, an apparatus according to one of the previous examples is provided, in which the locker has an electrically controllable locking device which is electrically coupled to the control unit and is designed to allow or deny access to the locker.

According to a seventh example, an apparatus according to one of the previous examples is provided, in which the checking unit comprises: an internal camera arranged so that an image of the interior of the locker can be taken by means of the internal camera, and/or a weighing scale arranged in such a way that the weight of the good in the locker can be measured by means of the weighing scale.

According to an eighth example, an apparatus according to one of the previous examples is provided, having an external camera for recording the customer who wishes to return the good and/or for recording the insertion of the goods into the locker and/or for recording the input of the information.

According to a ninth example, an apparatus according to one of the previous examples is provided, having a housing in which the reading unit, the input unit, the display unit, the locker, the checking unit, the control unit, the internal camera, the weighing scale and/or the external camera are arranged.

According to a tenth example, a method for operating an apparatus according to one of the previous examples is provided, in which the reading unit is used to capture the proof showing information relating to the good; the display unit is used to display the proof and/or the details and the customer who wishes to return the goods is prompted to input information about the good and the reason for the exchange and to place the goods in the locker; the control unit is used to unlock the locker and to check whether the good is in the locker; the control unit is used to check whether the good can be returned on the basis of the details and the input information; and the return is approved if the good can be returned and the good is in the locker.

According to an eleventh example, a method according to the tenth example is provided, in which the details concerning the good are encoded in a barcode and the barcode is scanned to capture the proof.

According to a twelfth example, a method according to the tenth or eleventh example is provided, in which the proof contains information about multiple goods, the details are displayed on the display unit and the customer is prompted by means of the display unit to use the input unit to select the goods to be returned.

According to a thirteenth example, a method according to one of the examples ten to twelve is provided, in which it is checked whether the good is in the locker by taking an image of the interior of the locker using the internal camera and using an image processing program to check whether the good is visible in the image, and/or by measuring a weight of the good in the interior using the weighing scale and checking whether the weight of the good in the interior corresponds to the weight of the good to which the detail relates.

According to a fourteenth example, a method according to one of the examples ten to thirteen is provided, in which the details show a date of purchase and a place of purchase of the good and in which it is checked whether the good can be returned by checking, based on the date of purchase, whether the exchange and/or return is being made within a specified period of time from the date of purchase, and/or by checking, based on the place of purchase, whether the place of return is suitable for the return.

According to a fifteenth example, a method according to one of the examples ten to fourteen is provided, in which, if the return is approved, a receipt is generated which is provided to the customer and is representative of the fact that the return is approved.

According to a sixteenth example, a method according to one of the examples ten to fifteen is provided, in which the control unit is used to check whether a predefined condition is met, and an employee of the store in which the good is to be exchanged and/or returned is informed if the predefined condition is met.

The invention is not limited to the specified exemplary embodiments. For example, the apparatus 20 may comprise more or fewer of the components shown in the foregoing. In addition, the steps of the method for operating the apparatus 20 can be executed in a different order than shown in the exemplary embodiment. For example, the good in the locker 28 can be checked first and then the proof of the purchase of the good can be checked. In addition, the customer may be prompted to enter their information at the beginning of the method, for example, to initiate the return, or right at the end, for example, to initiate the provision of the receipt.

LIST OF REFERENCE SIGNS 20 apparatus
22 reading unit
24 input unit
26 display unit
28 locker
30 internal camera
32 weighing scale
34 locking device
36 output unit
38 external camera
40 control unit
42 housing

The invention claimed is:

1. An apparatus for the automated return of a good having:
a barcode scanner for capturing a proof containing first details, encoded in a barcode, concerning the good, to check whether the good can be returned;
a keyboard and/or a touch screen for inputting information representative of the good and a reason for the return to check whether the good can be returned;
a display for displaying the proof containing the first details and the inputted information;
at least one locker, which can be automatically unlocked to receive the good if the good can be returned and automatically locked after the good has been received;
an internal camera and a weighing scale that are arranged and designed such that the internal camera and the weighing scale can be used to check whether or not the good is in the locker and approve the return if the good is in the locker, and to prevent the return if the good is not in the locker, and wherein the internal camera is configured to capture an image of an interior of the locker and transmit the image for inspection to an employee remote from the apparatus; and
an output unit configured to print a receipt which is provided to a customer and is representative of the fact that the return is approved and configured to print second details on the receipt in one of a one-dimensional and two-dimensional barcode that is invisible to the naked eye.

2. The apparatus as claimed in claim 1 wherein the first details are representative of when and where the good was purchased.

3. The apparatus as claimed in claim 1 wherein the first details are representative of the customer who wishes to return the good.

4. The apparatus as claimed in claim 1 the display is configured to display various selection options.

5. The apparatus as claimed in claim 1 the locker further comprises:
an electrically controllable locking device that is configured to allow or deny access to the locker.

6. The apparatus as claimed in claim 1 further comprising:
an external camera for recording at least one of the customer who wishes to return the good, the placement of the good in the locker, and the input of the information by the customer.

7. The apparatus as claimed in claim 6 further comprising:
a housing in which the barcode scanner, the keyboard and/or touch screen, the display, the locker, the internal camera, the weighing scale, and the external camera are arranged.

8. A method for operating an apparatus for the automated return of a good comprising:
scanning with a barcode scanner an encoded barcode to capture a proof containing first details concerning a good, to check whether the good can be returned;
receiving with a keyboard and/or a touch screen inputted information representative of the good and a reason for the return;
displaying with a display the proof containing the first details and the inputted information representative of the reason for the return and an instruction to place the good in a locker which can be automatically unlocked to receive the good if the good can be returned and automatically locked after the good has been received;
unlocking the locker with an electrically controllable locking device;
checking with an internal camera configured to capture an image of an interior of the locker and transmit the image for inspection to an employee remote from the apparatus and a weighing scale in the locker to determine whether the good is in the locker;
one of approve the return and prevent the return on a basis of the whether or not the good is in the locker; and
printing, with an output unit of the apparatus, a receipt which is provided to a customer and is representative of the fact that the return is approved and configured to print second details on the receipt in one of a one-dimensional and two-dimensional barcode that is invisible to the naked eye.

9. The method as claimed in claim 8 wherein the first details includes multiple goods and said displaying further comprises:
displaying, with the display, the first details and prompting a customer by the display to use the keyboard and/or the touch screen to select the good among the multiple goods to be returned.

10. The method as claimed in claim 8, wherein said checking further comprises:
recording an image of an interior of the locker with the internal camera;
checking whether the good is visible in the image with an image processing program of the apparatus; and
using the weighing scale to measure a weight of the good in the interior and checking whether the weight of the good in the interior corresponds to the weight of the good to which the detail relates.

11. The apparatus of claim 1 wherein the display is further defined as an LCD display or an OLED display.

12. The method of claim 8 further comprising:

sending a notification to an employee remote from the apparatus that price of the good is above a predefined price threshold and displaying with the display the return of the good is not authorized.

13. The apparatus of claim 8 further comprising:

transmitting the image of the interior of the locker for inspection to an employee remote from the apparatus.

* * * * *